United States Patent [19]

Ferchland

[11] 3,919,752

[45] Nov. 18, 1975

[54] MILLING CUTTER

[75] Inventor: Harold W. Ferchland, Troy, Mich.

[73] Assignee: General Motors Corporation, Detroit, Mich.

[22] Filed: May 20, 1974

[21] Appl. No.: 471,222

Related U.S. Application Data

[60] Division of Ser. No. 374,112, June 27, 1973, Pat. No. 3,839,942, which is a continuation-in-part of Ser. No. 216,212, Jan. 7, 1972, abandoned.

[52] U.S. Cl.............................................. 29/103 R
[51] Int. Cl.$^2$.......................................... B26D 1/12
[58] Field of Search........... 29/103 R, 104; 144/218, 144/239; 90/11 C

[56] References Cited

UNITED STATES PATENTS

| | | | |
|---|---|---|---|
| 2,858,599 | 11/1958 | Broom | 29/103 R |
| 2,922,449 | 1/1960 | Sam | 144/239 |
| 3,496,618 | 2/1970 | Como | 29/103 R |

FOREIGN PATENTS OR APPLICATIONS

| | | | |
|---|---|---|---|
| 1,425,829 | 12/1965 | France | 90/11 C |
| 676,225 | 5/1949 | United Kingdom | 29/103 R |

*Primary Examiner*—Harrison L. Hinson
*Assistant Examiner*—W. R. Briggs
*Attorney, Agent, or Firm*—Ronald L. Phillips

[57] ABSTRACT

A circular milling cutter for milling a curved groove of constant radius having circumferentially spaced teeth with peripheral cutting edges that lie on a conical surface whose vertex lies on the cutter's axis and with the ends of these cutting edges spaced from the vertex at distances equal to the radii of the groove's opposing side walls. The teeth further have either curved side cutting edges with radii from a common point on the cutter axis which intersect the cutting edge ends or straight side cutting edges perpendicular to the peripheral cutting edges. Furthermore, the teeth in one embodiment have relieved flanks on only the side closest to the vertex of the peripheral cutting edges. In simultaneously milling grooves in opposite sides of a part, there are employed two cutters with each cutter axis arranged to intersect the centerline of curvature of the respective groove at an angle where the peripheral cutting edges pass parallel to the respective work surface and the side cutting edges are perpendicular thereto. There is first performed a plunge cut by both cutters to the groove depth while the relative angularity between the cutters and workpiece is maintained whereafter the workpiece is turned about the common centerline of the grooves to effect milling the length of the grooves.

2 Claims, 11 Drawing Figures

MILLING CUTTER

This is a Division of Ser. No. 374,112 filed June 27, 1973 now U.S. Pat. No. 3,839,942, which is a Continuation-In-Part of Ser. No. 216,212, filed Jan. 7, 1972 now abandoned.

This invention relates to a milling cutter and more particularly to a circular milling cutter and method for milling curved grooves.

In the machining of grooves, an important factor to consider is the relationship of groove depth to groove width. For example, the depth-to-width ratio is determinative of whether a cylindrical end milling cutter and/or a circular flat milling saw or cutter can perform the necessary cutting operation with the former type cutters becoming less feasible with increasing ratio. Furthermore, when the groove has curvature, the choice is even more limited since a circular flat milling cutter overcuts the groove width on entry and exit of the material. Such a compounded problem exists, for example, with regard to the side seal grooves in the rotor in presently commercial internal combustion rotary engines with such side seal grooves typically having a high depth-to-width ratio, a constant radius of curvature and very smooth side wall texture requirements. Cylindrical end milling cutters were found to be not sufficiently rigid for the high seal groove depth-to-width ratio and on the other hand, conventional flat circular milling cutters cannot meet the specifications because of overcutting of the groove.

The milling cutter according to the present invention which is capable of satisfactorily meeting all such requirements has circumferentially spaced teeth having peripheral cutting edges that lie on a conical surface whose vertex lies on the cutter axis. The ends of the peripheral cutting edges are spaced from the vertex at distances equal to the radii of the groove's opposing side walls. The cutter teeth further have side cutting edges on opposite axial sides that are parallel and spaced apart a distance equal to the groove width. These side cutting edges have either a curvature with radii from a common point on the cutter axis which intersect the cutting edge ends or are straight and perpendicular to the peripheral cutting edges. In milling a groove the cutter axis is arranged to intersect the centerline of curvature of the groove. In addition the cutter axis is tilted at an angle which has the peripheral cutting edges parallel to the work surface and the side cutting edges perpendicular thereto. The cutter is then fed into the workpiece to the required groove depth while the intersection of the cutter axis and groove centerline and also the stated angularity is maintained. Then the cutter axis is fixed and the workpiece is turned about the groove centerline to effect milling the length of the groove. Furthermore, it has been found that friction between the teeth and the workpiece during cutting is not substantially increased by providing relieved flanks on only the side of the teeth closest to the vertex of the peripheral cutting edges. With relieved flanks on only one side of the cutter teeth, the cutter is much simpler to manufacture and therefore has a greatly reduced cost as compared with a cutter with relieved flanks on both sides of the teeth. In addition, identical grooves in opposite sides of the workpiece are simultaneously cut with very close accuracy by similarly mounting two cutters in relation to the opposite sides and these grooves' common centerline and performing the cutting operations as before.

An object of the present invention is to provide a new and improved milling cutter.

Another object is to provide a milling cutter having teeth with relieved flanks on only one side for milling a curved groove that simultaneously cuts opposing sides of the groove without overcutting the top of the groove on one side as the cutter enters and without overcutting the opposite side of the groove as the cutter leaves.

Another object is to provide a milling cutter having teeth with peripheral cutting edges and side cutting edges and relieved flanks on only one side that are determined in relationship to the radius of curvature of a groove to be machined so as to accurately cut the groove when the cutter axis is arranged to intersect the centerline of the groove at a certain angle.

Another object is to provide a milling cutter for milling a groove having a constant radius of curvature with the cutter having teeth with peripheral cutting edges that lie on a conical surface whose vertex lies on the cutter axis and further having either curved side cutting edges that lie on spherical surfaces whose radii from a common point on the cutter axis are equal to the radii of the groove sides or lie on a conical surface whose vertex lies on the cutter axis at an axial location so that the straight side cutting edges are perpendicular to the peripheral cutting edges and wherein the teeth in either case have relieved flanks on the side closest to the vertex of the peripheral cutting edges.

Another object is to provide for simultaneously milling curved grooves on opposite sides of a workpiece by rotating a pair of milling cutters on opposite sides of the workpiece having angled peripheral cutting edges about axes intersecting a centerline which extends through the center point of curvature of the grooves to be machined and is parallel to the groove sides and at angles where the peripheral cutting edges parallel the groove bottoms and then effecting relative movement between the cutters and the workpiece while maintaining the angularity of the cutters until the peripheral cutting edges reach the desired groove depths and then turning the workpiece about the centerline to effect cutting the length of the grooves. These and other objects of the present invention will be more apparent from the following description and drawing in which:

Figure 1:
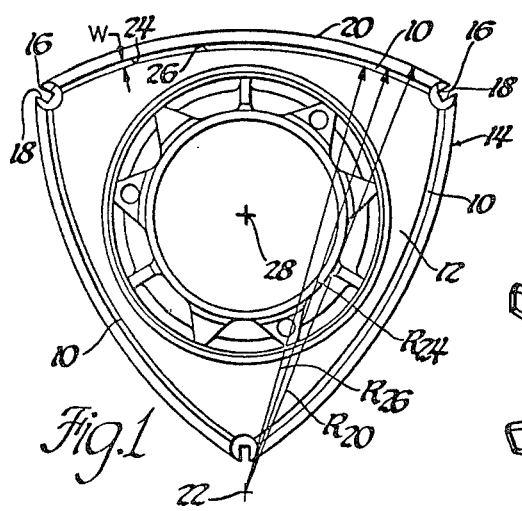
FIG. 1 is a side view of a rotor in an internal combustion rotary engine with the rotor having side seal grooves that may be milled by a milling cutter according to the present invention.
Figure 2:
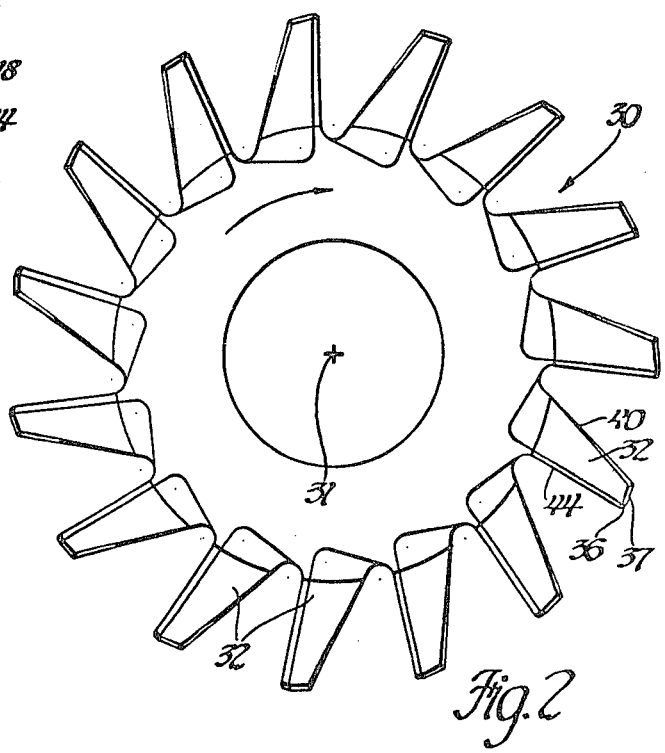
FIG. 2 is an enlarged view of a milling cutter according to the present invention for milling the side seal grooves in the rotor of FIG. 1.
Figure 4:
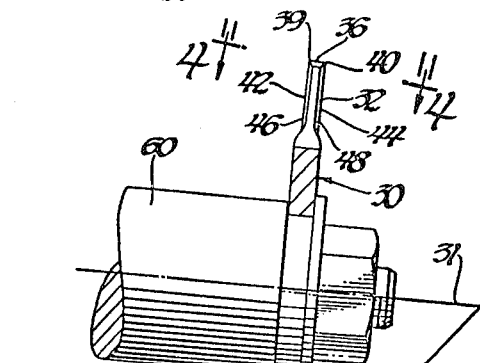
FIG. 4 is a view of one of the cutter teeth taken along the line 4—4 in FIG. 3.

Referring to FIG. 1, the milling cutter according to the present invention is particularly suited for milling the side seal grooves 10 that are on each flat side 12 of the generally triangularly shaped rotor 14 of a presently commercial type internal combustion rotary engine. The grooves 10 are for receiving side seals, not shown, that seal against the interior end walls of the engine housing. At each rotor apex, adjacent side seal grooves 10 intersect a cylindrical hole 16 which is for accommodating a cylindrical button seal member, not shown, which contacts one of the engine's interior end walls and provides a sealing link between adjacent side seals and an apex seal, not shown, which is carried in a slot 18 extending across each rotor apex, such sealing arrangement being well-known in this engine art.

Figure 3:
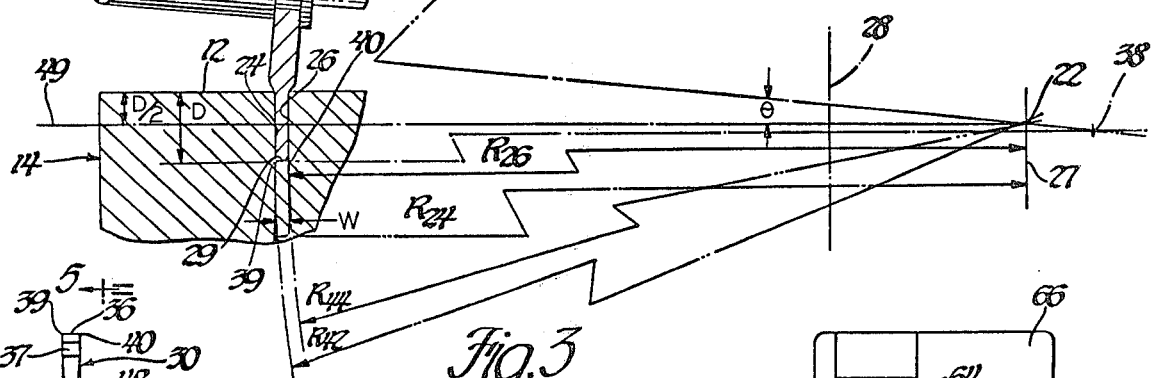
FIG. 3 is a reduced radial sectional view of the milling cutter of FIG. 2 and showing its relationship to the rotor workpiece during milling of a side seal groove.
Figure 5:
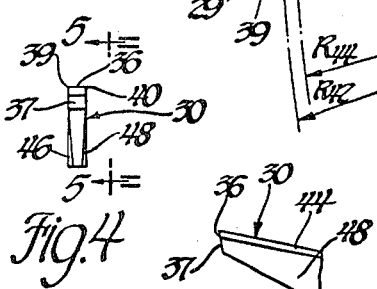
FIG. 5 is a view of the one cutter tooth taken along the line 5—5 in FIG. 4.

Each side seal groove 10 and adjacent rotor face 20 have a constant radius of curvature from a common center point designated at 22 in FIG. 1. As shown, the rotor face 20 has a radius $R_{20}$ and the radially inward facing wall 24 and the radially outward facing wall 26 of groove 10 have raddi $R_{24}$ and $R_{26}$, respectively, with the difference in these groove radii being the width of the seal groove 10 which is designated as W. As shown in FIG. 3, each groove 10 is rectangular-shaped in radial cross-section with the opposing groove sides 24 and 26 and also the adjacent rotor face 20 perpendicular to the rotor side 12 and parallel to a centerline 27 which intersects the common center point 22 and is parallel to the rotor's axis 28. The groove's flat bottom 29 is perpendicular to the groove sides 24 and 26 and parallel to the rotor's side 12 with the depth of the groove being designated as D.

As a general rule of thumb, the machining of a straight groove with a depth-to-width ratio greater than 2:1 presents a tooling problem primarily in attempting to provide a cutting tool of sufficient strength with the problem becoming amplified in the case of curved grooves which limit a rotary tool's peripheral length and thus limit tool performance. A further problem results where one or more of the groove's surfaces are required to be very smooth. For example, in one actual side seal groove specification for a rotary engine, it was desired to machine the groove to a depth D of about 0.170 inches and width W of about 0.040 inches which gives a depth-to-width ratio of about 4:1. In addition to this very high depth-to-width ratio, the groove was to have a radius of about 9.0 inches with a required side wall surface texture of better than 30 micro inches. It was found that conventional milling cutters such as cylindrical or the flat circular type machining in an arc could not meet all of the requirements in that they failed to meet either the specifications of the groove or the short machining time and tool performance necessary for practical high volume production.

I have found that it is possible to mill curved grooves with a high width-to-depth ratio, for example greater than 2:1, with a circular milling cutter having a unique shape. Referring to FIGS. 2–5, there is shown a circular milling cutter 30 constructed according to the present invention capable of machining the side seal grooves 10 in the rotor 14 with the specifications previously described. The circular milling cutter 30 which may also be called a milling or rotary saw is rotatable about a central axis 31 in the direction indicated by the arrow in FIG. 2 and has a plurality of equally circumferentially spaced teeth 32. Each of the cutter teeth 32 has a tip having a peripheral leading cutting edge 36 and a trailing relieved portion 37. All of the peripheral cutting edges 36 of the teeth are formed to lie on a conical surface whose vertex 38 is intersected by the cutter axis 31 as shown in FIG. 3. The ends 39 and 40 of each peripheral cutting edge 36 are spaced from the groove axis at distances equal to the radii $R_{24}$ and $R_{26}$ of the groove's opposing side walls 24 and 26, respectively, and thus the peripheral cutting edges 36 have a length equal to the width W to be machined. Each of the cutter teeth 32 also has on opposite axial sides parallel side cutting edges 42 and 44 which extend from the peripheral cutting edge ends 39 and 40 radially inward a distance at least greater than the groove depth D. The side cutting edges 42 and 44 have trailing relieved flanks 46 and 48, respectively, and may be either curved or straight as will now be described.

In the curved side cutting edge embodiment of the milling cutter, the cutting edges 42 and 44 are formed to lie on spherical surfaces which have a common center that is intersected by the cutter axis 31 and radii $R_{42}$ and $R_{44}$ which intersect the cutting edge ends 39 and 40 and thus are slightly larger than the groove side wall radii $R_{24}$ and $R_{26}$, respectively. With such side cutting edge curvature, the milling cutter may be described as a spherically shaped milling cutter. Alternatively, in the straight side cutting edge embodiment of the milling cutter, the side cutting edges 42 and 44 are formed to lie on conical surfaces having axially spaced vertexes on the cutter axis 31 with the cone angle determined so that these straight side cutting edges are perpendicular to the peripheral cutting edges 36. With this side cutting edge form, the milling cutter may be described as a conically shaped milling cutter.

To machine a groove, the cutting axis 31 is arranged to intersect the groove centerline 27 and is tilted at an angle $\Theta$ as illustrated in FIG. 3 with respect to a line 49 that intersects the cutter axis 31 and is perpendicular to both of the side cutting edges 42 and 44 at points spaced half of the groove depth, i.e. D/2, from the peripheral cutting edges 36. At angle $\Theta$ the peripheral cutting edges 36 as they pass the surface to be machined are parallel thereto while the side cutting edges 42 and 44 are perpendicular to the surface during the pass. The milling cutter 30 while being powered to rotate is then fed into the rotor workpiece in a direction perpendicular to the surface to the required depth. Then the workpiece is turned about the groove centerline 27 while the angle $\Theta$ is maintained whereupon the rotary cutting action of the cutting edges 36 mills the length of the groove. Since the cutting edges 36 lie on a conical surface, these edges inherently track the groove's curvature as compared with a cutter whose cutting edges lie on a cylindrical surface and would inherently track a straight path rather than the groove's curvature. Thus, the milling cutter 30 with its inherent curved tracking action performs free cutting of the curved groove. When the groove is milled with a conically shaped milling cutter according to the present invention, both of the groove sides 24 and 26 are perpendicular to the rotor side and groove bottom; however, when a spherically shaped milling cutter according to the present invention mills the groove, the radially outward facing groove wall 26 is cut perpendicular like with the conically shaped milling cutter, but the radially inward facing groove wall 24 is slightly undercut in the lower half due to the convex curvature on this cutter side which interferes with cutting a perpendicular wall. The other side of the spherically shaped cutter is convex with respect to the groove wall 26 and thus does not interfere with full straight cutting of that side. The gas pressures in this rotary engine always act to force the side seal against the radially outwardly facing side wall 26 and thus the slight undercutting on the opposite side wall that results from the spherically shaped milling cutter embodiment can be acceptable for such use. It will, of course, be appreciated that the number of cutter teeth will be based on the type of material being machined and its state at the time of machining. Furthermore, the milling cutter can be made from a high speed tool steel or the actual cutting tooth portions may be made from carbide, whichever is best suited to machine the particular material.

Another advantage provided by the milling cutter according to the present invention is found in the machining of these side seal grooves wherein it is desired to not have the seal groove intersect the button seal hole wall at the other side since such overcutting adversely affects sealing at these locations. With the milling cutter according to the present invention, its diameter can be made small enough so as to not bridge the button seal holes at the beginning and ending of a cutting pass. For example, in the previously discussed actual side seal specifications where the groove has a depth of about 0.170 inches and a width of about 0.040 inches, the attendant button seal holes for the structure have a diameter of about 0.44 inches. I have found that a milling cutter according to the present invention having a radius of about 0.390 inches satisfactorily performs the groove cutting operation along its entire length from one button seal hole to the other but does not bridge the larger size button seal holes at the groove ends and thus does not cut into the wall of the button seal holes opposite where the groove intersects therewith.

Figure 6:
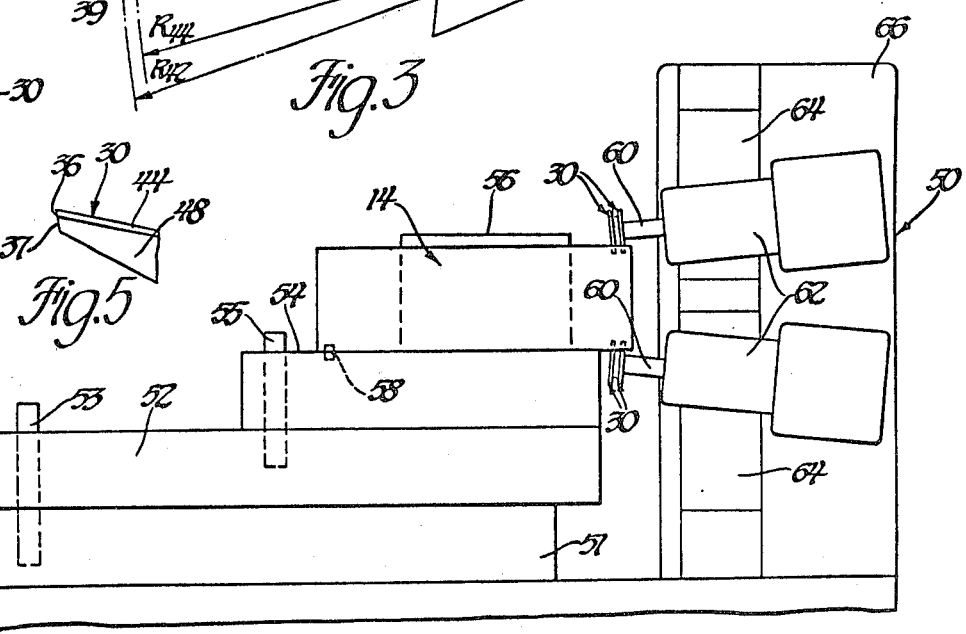
FIG. 6 is an elevational view of a machine tool arrangement employing milling cutters according to the present invention for simultaneously machining pairs of side seal grooves in opposite sides of a rotor.
Figure 7:
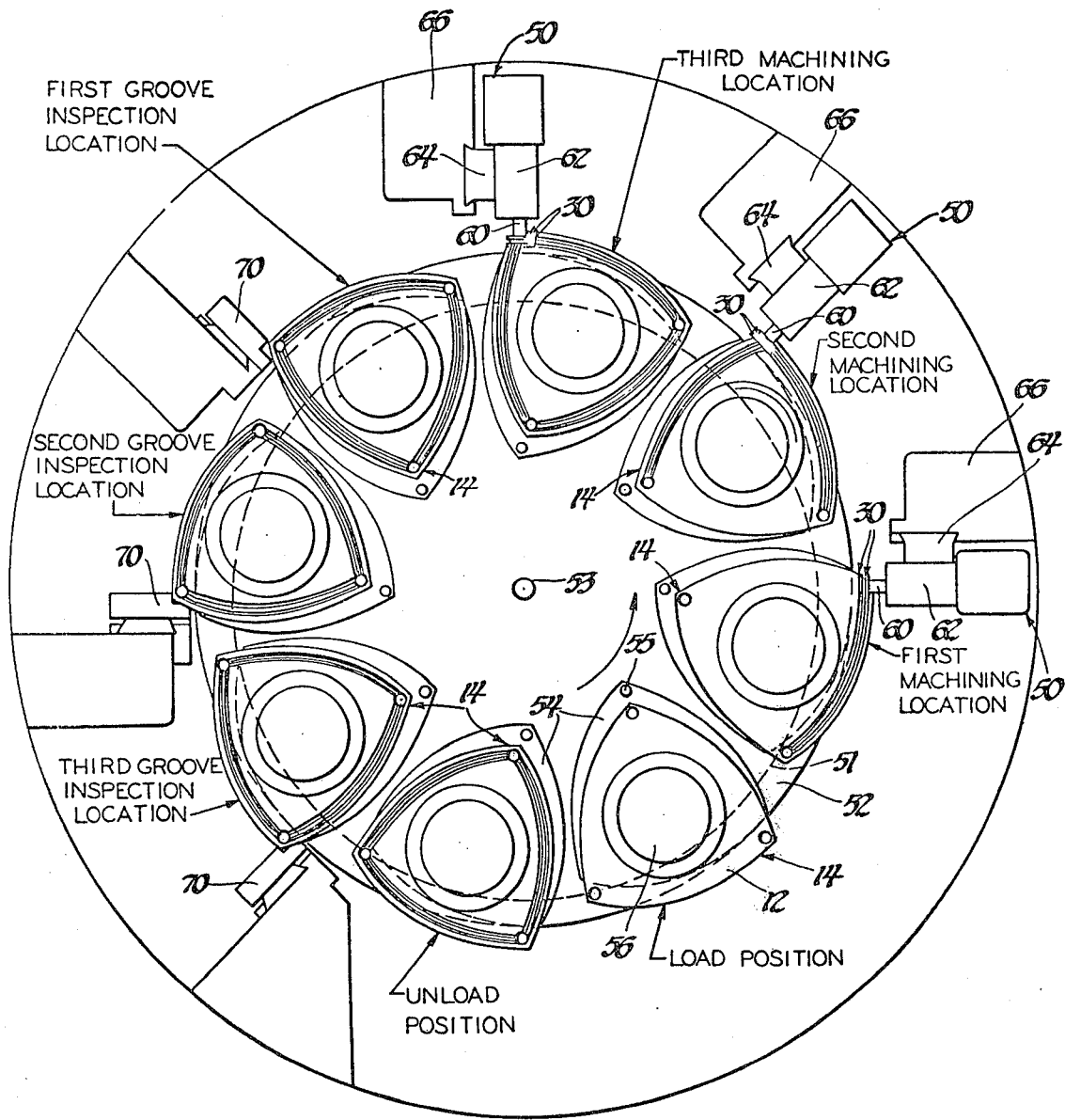
FIG. 7 is a plan view of the machine tool arrangement of FIG. 6.

Referring to FIGS. 6 and 7, there is shown a milling machine arrangement 50 for using the milling cutters according to the present invention. The machine is generally of the carousel type having a platform 51 which supports a rotary table 52 for rotation about a spindle 53. The rotary table 52 in turn supports a fixture 54 for pivotal movement about a spindle 55. A rotor workpiece 14 whose side seal grooves are to be milled is loaded on to the fixture 54 and is located relative thereto by a plug 56 in the center hole of the rotor and a pin 58 in the button seal hole opposite the grooves to be machined, both the plug 56 and pin 58 fitting holes in the fixture 54. With the rotor 14 thus properly positioned, it is then fixed firmly in place by suitable means. In this case, not one but two parallel side seal grooves are to be cut in each side of the rotor 14. For such machining operation, there are provided three milling machine stations which each have a pair of milling cutters 30 according to the invention mounted on arbors 60 of motorized spindles 62 that are arranged to be located on either side of the rotor on slides 64. In this arrangement, the cutters on the opposite sides of the rotor turn in opposite directions in proper relationship to the direction of feed with their cutting directions matched thereto, i.e. they are designed to cut in opposite directions. The slides 64 are supported on a slide carrier 66 to move the milling cutters toward the work and away. In addition, the axes of the spindles 62 are pivotable to position the miller cutters at the proper angle relative to the workpiece. This inclination is measured relative to the side of the rotor to be machined with the angle point of origin coincidental with the centerline of the grooves which is located to coincide with the axis of spindle 55 about which the fixture 54 can pivot, this angularity positioning the acting peripheral cutting edges of the cutters parallel to the rotor side and the acting side cutting edges perpendicular thereto.

Describing now a typical sequence of events, a rotor 14 is loaded on the rotary fixture 54 when the table 52 is in a load position as shown in FIG. 7. The table 52 is then rotated or indexed by suitable means to a first machining location where one of the milling cutter arrangements 50 is located. At this location, one of the button seal holes 16 in each rotor side is aligned with the milling cutters 30. Both sets of cutters while being powered to rotate in opposite directions are then advanced by suitable means at a rapid speed to a certain distance from the rotor surface and from this point the cutters are fed at a reduced rate into the rotor to the required groove depth. When the cutters are at full depth the fixture 54 is pivoted about the spindle 55 by suitable means with the pivoting of the fixture 54 and thus the length of cut continuing until the button seal hole at the approaching apex is reached. Upon reaching this other button seal hole, the cutters are retracted from the groove and the table 52 is indexed to position the rotor whose one set of grooves have just been machined in a second machining location 50 where there is another machine cutter arrangement. As the table 52 indexes to the second machining location, the fixture 54 is returned to its initial position and the rotor 14 is indexed about its axis relative to fixture 54 by suitable means to position the rotor for the machining of another set of grooves at the second machining location in the same manner as performed at the first machining location. The table 52 is then indexed to a third machining location 50 while the fixture 54 and the rotor 14 are indexed for milling of the third set of grooves by the third machine cutter arrangement. Thus, the accuracy of the radii of the grooves on both rotor sides and their concentricity can be held to very close tolerances since all the cutting is relative to a common axis which is that of the spindle 55. There is in addition provided three groove inspection machines 70 at first, second and third groove inspection locations which are circumferentially spaced about the platform 51. These inspection machines may be of any suitable type that is operable to inspect the grooves for width and depth of cut and surface texture with the rotating table 52 and fixture 54 indexing the rotor 14 as in the machining operations to properly locate the grooves in relation to these inspection machines for the inspection. After the final inspection location, the table 52 indexes to an unloading position to complete the machining and inspection cycles for all of the side seal grooves in the rotor.

Figure 8:
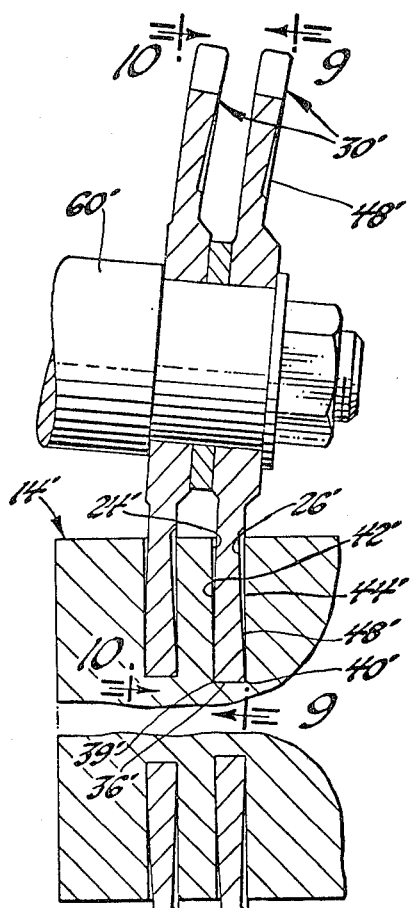
FIG. 8 is an enlarged elevational view with parts in section of a machine tool arrangement like that shown in FIG. 6 but employing milling cutters according to another embodiment of the present invention for simultaneously machining pairs of side seal grooves in opposite sides of a rotor.
Figure 9:
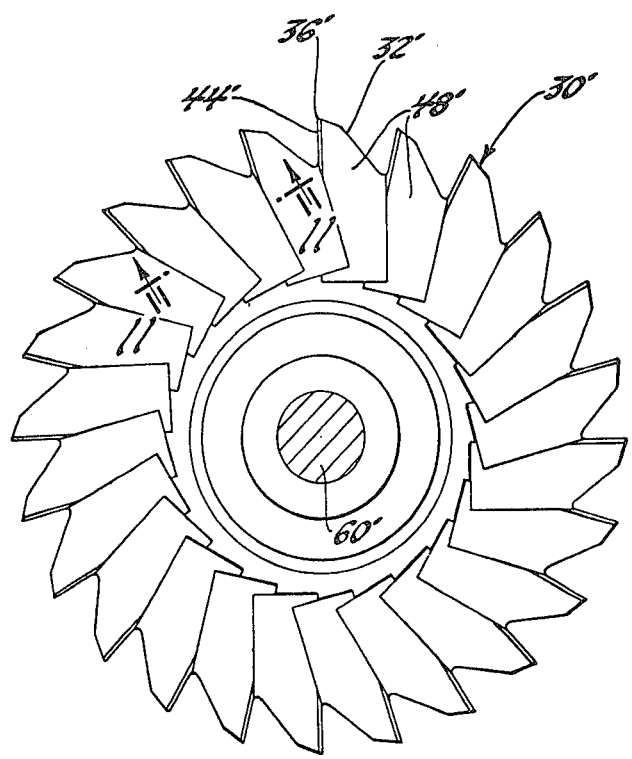
FIG. 9 is a view of one side of the milling cutters in FIG. 8 taken along the line 9—9 in FIG. 8.
Figure 11:
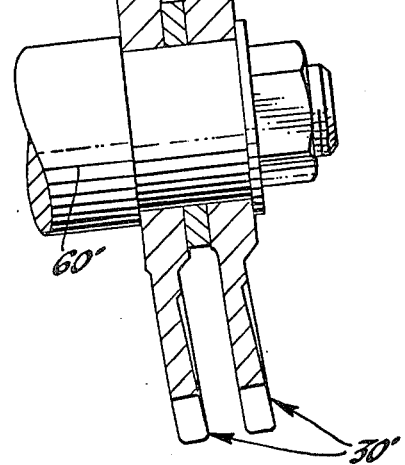
FIG. 11 is a view of the teeth of the milling cutters in FIG. 8 taken along the line 11—11 in FIG. 9.
Figure 10:
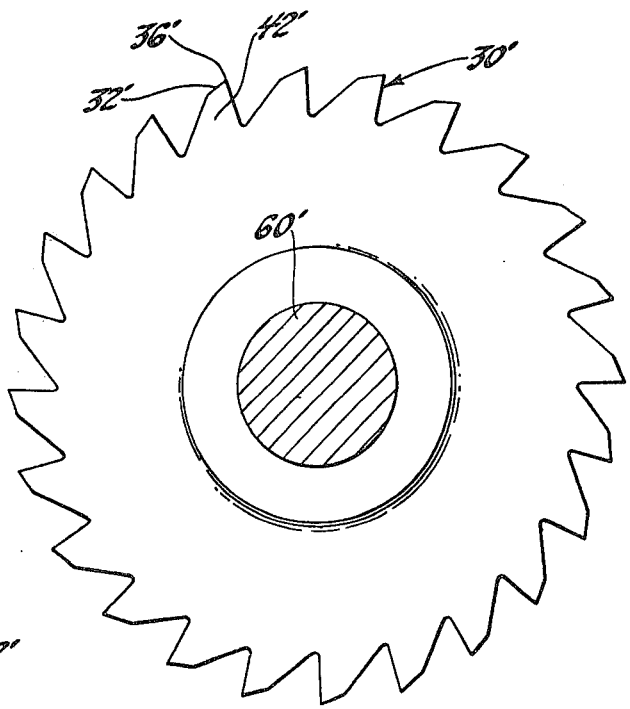
FIG. 10 is a view of the other side of the milling cutters in FIG. 8 taken along the line 10—10 in FIG. 8.

In addition, it has been found that rubbing friction between the cutter teeth and the workpiece is not substantially increased while the cost of manufacturing the cutter is greatly reduced by simply providing relieved flanks on one certain side of the cutter teeth as shown in FIGS. 8–11 wherein like numerals except for being primed identify corresponding parts in FIGS. 1–7. At this point it is recalled that in conventional cutters the peripheral cutting edges of the teeth actually produce the groove form while both of the side edges of the teeth do clean-up and also guide against the groove walls for stability. As shown in FIG. 8 in a multi-tooled arrangement as previously described and in separate detail in FIGS. 9, 10 and 11, another embodiment of the milling cutter 30' has teeth 32' with peripheral cutting edges 36' and also parallel sides which are either spherical or conical surfaces and have side edges 42' and 44' intersecting the peripheral cutting edge ends 39' and 40' as previously described. However, relieved flanks 48' are provided on only the small radius groove side of the teeth that has the side edges 44' that rub against the small radius side 26' of the groove, this cutter tooth side being the closest to the vertex of the peripheral cutting edges 36'. As shown in FIGS. 8, 9 and 11, the other side of the teeth with side edges 42' is not relieved. The relieved flanks 48' which are concave in cross-section as best shown in FIG. 11 and normally individually ground reduce the friction between this side of the cutter teeth and the radially outwardly facing groove side 26' while the unrelieved other side of the teeth radially inward of the peripheral cutting edges 36' has a natural clearance with the radially inwardly facing large radius groove side 24', this clearance shown exaggerated in FIG. 8 and occurring whether this cutter side is a spherical or conical surface. With the cutter 30', the peripheral cutting edges 36' of the teeth cut into the rotor to actually produce the groove form as before but now only the small radius groove side of the cutter teeth with the relieved flanks 48' acts to guide against the small radius groove side 26'. The stability obtained from this one side has been found sufficient and the surface finish satisfactory for rotary engine side seal grooves. For example, such grooves have been cut with milling cutters 30' to required tolerances in width of 0.040–0.041 inch, depth of 0.168–0.173 inch, and surface texture of 30RMS on both groove sides, such tolerances not generally being achieved in a milling operation without a second operation of grinding.

The above described embodiments are illustrative of the invention which may be modified within the scope of the appended claims.

I claim:

1. A milling cutter for milling a curved groove having two parallel opposed sides with different radii of curvature relative to a common centerline, said cutter having a body with oppositely facing sides and an axis of rotation and radially projecting, circumferentially-spaced teeth, said teeth having peripheral cutting edges with axially spaced ends that lie on a conical surface whose vertex is intersected by said axis on one side of said cutter body, said ends of said peripheral cutting edges spaced from said vertex at different radii, said teeth further having parallel sides that are straight and intersect said ends of said peripheral cutting edges, said teeth sides having radially extending edges that intersect said ends of said peripheral cutting edges, and only said side of said teeth closest to said vertex on said one side of said cutter body having relieved flanks that trail the radially extending edges on this side when said cutter is rotated in a cutting direction.

2. A milling cutter for milling a curved groove having two parallel opposed sides with different radii of curvature relative to a common centerline, said cutter having a body with oppositely facing sides and an axis of rotation and radially projecting, circumferentially-spaced teeth, said tetth having peripheral cutting edges with axially spaced ends that lie on a conical surface whose vertex is intersected by said axis on one said of said cutter body, said ends of said peripheral cutting edges spaced from said vertex at different radii, said teeth further having parallel sides that are spherical surfaces having a common center on said axis and radii intersecting said ends of said peripheral cutting edges, said teeth sides having radially extending edges that intersect said ends of said peripheral cutting edges, and only said side of said teeth closest to said vertex on said one side of said cutter having relieved flanks that trail the radially extending edges on this side when said cutter is rotated in a cutting direction.

* * * * *

UNITED STATES PATENT AND TRADEMARK OFFICE
CERTIFICATE OF CORRECTION

PATENT NO. : 3,919,752
DATED : November 18, 1975
INVENTOR(S) : Harold W. Ferchland It is certified that error appears in the above—identified patent and that said Letters Patent are hereby corrected as shown below:

Column 3, line 31, "raddi" should read -- radii --.
Column 8, line 28, "tetth" should read -- teeth --; line 30, "said" second occurrence, should read -- side --.

Signed and Sealed this twenty-seventh Day of April 1976

[SEAL]

Attest:

RUTH C. MASON
Attesting Officer

C. MARSHALL DANN
Commissioner of Patents and Trademarks